Patented Oct. 26, 1926.

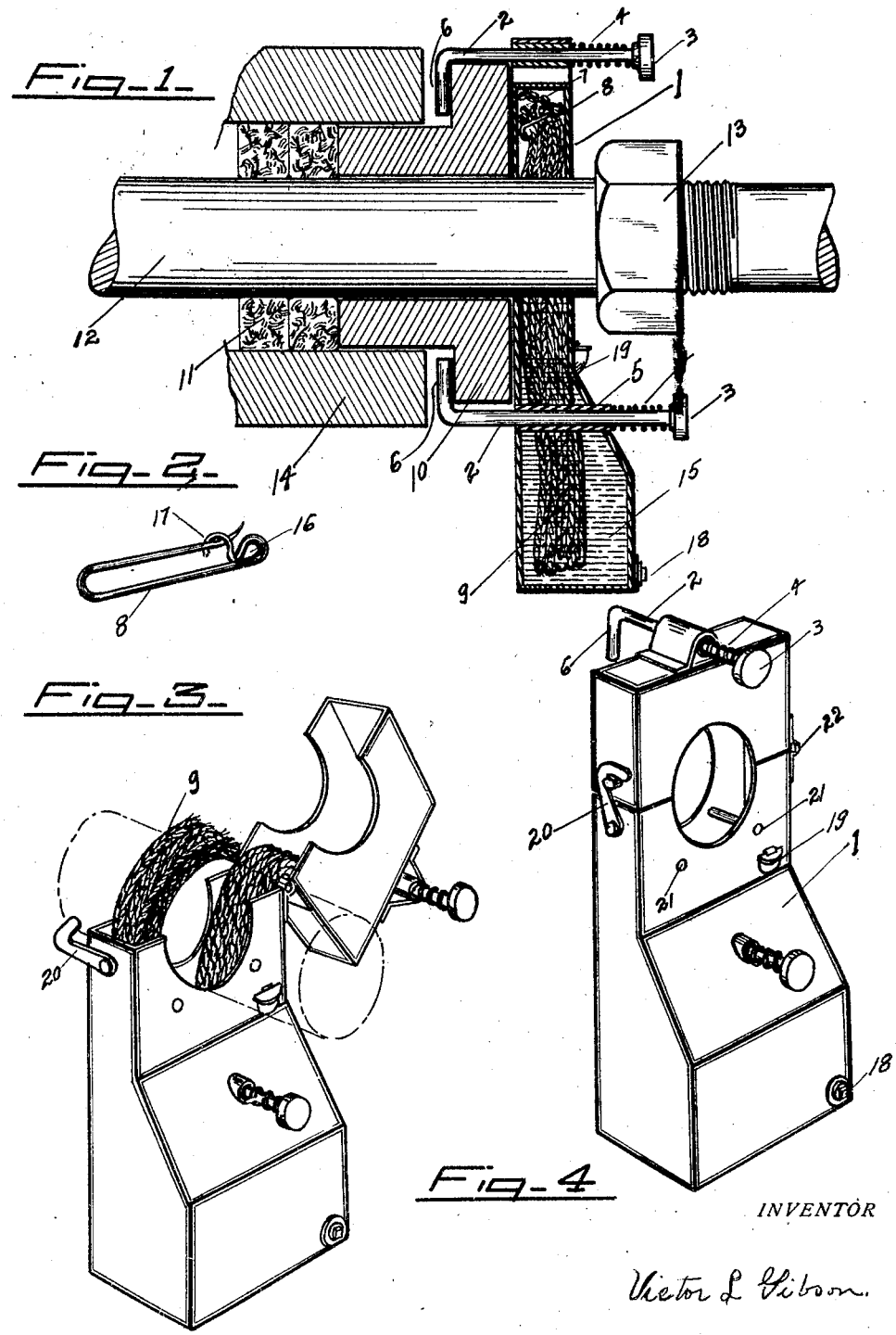

1,604,407

UNITED STATES PATENT OFFICE.

VICTOR L. GIBSON, OF LOS ANGELES, CALIFORNIA.

PISTON-ROD OILER.

Application filed November 24, 1925. Serial No. 71,120.

My invention relates to improvements in piston rod oilers in which a yarn swab which also acts as a wick, contained within a suitably shaped metal box containing oil, constantly swabs and conveys oil to the piston rod, said box being positioned against the face of packing gland with piston rod operating through same; and the objects of my improvements are, first, to provide a continuous lubrication for the piston rod; second, to provide a piston rod oiler which may be readily placed in position against the packing gland and easily removed from said position; third, to provide an economical piston rod oiler which will not supply a superfluous amount of oil to rod.

I attain these objects by the construction illustrated in the accompanying drawing in which—

Figure 1 is a vertical section of the oiler placed in a working position.

Figure 2, a detail of the spring wire clip used to fasten the two ends of oil swab.

Figure 3, a view showing the oiler with cover thrown back.

Figure 4, a view showing oiler with cover closed and locked.

Similar numerals refer to similar parts throughout the views.

The box 1 is made in two parts, the upper section being hinged at 22. A hook 20 is provided for securing same in a closed position. The upper portion of box 1, as shown, does not possess unusual thickness and is so constructed as not to interfere with the operation of piston rod 12 in its travel to and fro, there being little clearance between nut 13 and packing gland 10. The lower portion of box 1 has an additional thickness, thereby giving it an increased oil capacity.

Figure 1 shows oiler in position and secured to the face of packing gland 10 which is in position against packing 11 within the stuffing box 14. Shafts 2, slidably mounted, carrying fingers 6 and passing through bushings 5 in box 1, are provided to hold box 1 in position, sufficient strain being produced through the action of compressed springs 4 to hold the box 1 tightly against face of packing gland 10, as accomplished by fingers 6 (due to pressure exerted by springs 4 against face of bushings 5 and knobs 3) pulling box 1 against face of packing gland 10.

By pressure against, and quarter turn of knobs 3, the grip of fingers 6 is removed from behind projection of gland 10, thus permitting the easy removal of box 1. It is readily understood that when fingers are in this position, the box can be slipped away from gland 10 if the piston rod is in the proper position, viz, with the crosshead or nut thereon standing away from packing gland 10, the box may be opened when in the above described position, exposing the ends of swab 9 which are fastened by the spring wire clip 8 illustrated in Figure 2. One end of wire clip 8 forms an eye 16 and a hook 17; under hook 17, the opposite end of clip 8 is secured after being passed over the ends of the strands of swab 9. Eye 16 of clip 8 is attached to a chain 7 which is fastened to cover of box 1 and prevents clip 8 from dropping to the bottom of box. It is readily seen that by removing spring clip 8 from the ends of swab 9, the entire oiling device may be then removed from its position on piston rod, or vice versa.

The pins 21 pass through the box 1 and the yarn swab 9 is threaded between pins, thus keeping swab 9 in close proximity to the bottom of piston rod 12. A lip 19, with cover, is provided on the front of box 1 at the desired height on same and is for the purpose of filling the lower portion of box with oil, also acting as an oil level gauge. A drain plug 18 is provided at the bottom of box 1 so that oil may be drained without disturbing the position of the box.

When oiler is in position and use, the swab 9, the lower portion of which is submerged in oil 15, acts as a wick, absorbing oil from bottom of box, and also acts as a swab for piston rod. As piston rod 12 passes to and fro through the box 1 it also passes through the loop in swab 9 which conveys to rod 12 a film of oil, thereby maintaining a constant lubrication in the proper amount, on the piston rod.

It will be readily understood, from the foregoing description, that the entire exposed portion of piston rod 12 must pass through the box 1 containing the swab 9, before entering the packing gland, so should dirt, mud or other substances adhere to rod 12, the most of same will be removed as rod passes through the close fitting holes in box, and the remainder by the swab 9, which, in turn, leaves a film of oil on rod as same passes into the packing chamber. The dirt removed from rod by swab, naturally deposits itself at the bottom of oil reservoir and only clean oil is again lifted into the swab by capillary attraction.

The piston rod oiler described is intended for use on horizontally operating piston rods. If its use is desired on vertically operating rods, it will be necessary to construct the box with an oil receptacle chamber at right angles to box proper, which will allow the retention of oil when main portion of box is in a horizontal position.

Having thus described my invention, I claim:

A piston rod oiler comprising a rectangular shaped metal box containing a swab, a supply of oil contained in the bottom of said box, an opening through said box for the reception of a piston rod, plungers passing through said box, hooks on one end of said plungers for engaging behind flange of a packing gland, knobs on opposite ends of said plungers and extended in front of said box, plungers held in a retracted position by compression springs around said plungers and acting against said knobs and the face of the box, substantially as described.

In witness that I claim the foregoing, I have hereunto subscribed my name this fourteenth day of November, 1925.

VICTOR L. GIBSON.